United States Patent
Tomihisa (10) Patent No.: US 8,368,907 B2
(45) Date of Patent: Feb. 5, 2013

(54) IMAGE FORMING APPARATUS AND IMAGE FORMING SYSTEM

(75) Inventor: Taishi Tomihisa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 879 days.

(21) Appl. No.: 12/467,882

(22) Filed: May 18, 2009

(65) Prior Publication Data

US 2009/0296142 A1    Dec. 3, 2009

(30) Foreign Application Priority Data

May 27, 2008 (JP) .................. 2008-138582

(51) Int. Cl.
G06F 15/00 (2006.01)
G06F 17/00 (2006.01)
(52) U.S. Cl. ...................... 358/1.13; 715/201
(58) Field of Classification Search ............... 358/1.13, 358/1.15
See application file for complete search history.

(56) References Cited

U.S. PATENT DOCUMENTS

2004/0243934 A1* 12/2004 Wood et al. ............ 715/517

FOREIGN PATENT DOCUMENTS

| JP | H10-058770 A | 3/1998 |
| JP | 2006-331191 A | 12/2006 |
| JP | 2007-152750 A | 6/2007 |

* cited by examiner

Primary Examiner — Saeid Ebrahimi Dehkordy
(74) Attorney, Agent, or Firm — Canon USA Inc IP Division

(57) ABSTRACT

Interpret processing of received PDL data and determination whether a command includes group information are performed. CPUs that are available for processing are searched, and based on the group information and information about divided objects, to which CPU each processing of the divided objects is to be assigned is determined. The CPUs to which the processing is assigned convert the received data into intermediate data suitable for processing in a printing unit. The plurality of CPUs are instructed to perform image generation processing based on the generated intermediate data in parallel for each processing unit.

18 Claims, 12 Drawing Sheets

IMAGE FORMING APPARATUS AND IMAGE FORMING SYSTEM

BACKGROUND OF THE INVENTION

1. Field of the Invention

The present invention relates to an image forming apparatus and an image forming system suitable for high-speed print processing.

2. Description of the Related Art

Various printing systems have been proposed in which an information processing apparatus and a printing apparatus are connected via parallel communication means, such as a Centronics interface, or network communication means. In such printing systems, the information processing apparatus (e.g., a host computer) uses a printer driver to convert rendering data (print instruction) sent by an application via an operating system (OS) into print data that the printing apparatus can interpret. The converted print data is sent to the printing apparatus.

The printing apparatus interprets the received print data and performs rendering (rasterization) to generate an image. The generated image is output using a printer engine. The print data contains a set of several kinds of objects (e.g., image, text, and graphic).

As an effective method for reducing time necessary for the image generation in printing in such a printing system, there is a method to perform a plurality of rendering processing in parallel. For example, Japanese Patent Application Laid-Open No. 10-58770 discusses an electronic printing apparatus that divides input print data into a plurality of bands and performs rendering processing for the individual bands in parallel using a plurality of processors. Further, Japanese Patent Application Laid-Open No. 2006-331191 discusses an image forming apparatus and a rendering processing method. In the image forming apparatus and the rendering processing method, overlapped objects are grouped, and rendering processing of the individual groups is assigned to processors and processed in parallel.

However, in the technique discussed in Japanese Patent Application Laid-Open No. 10-58770, depending on complexity (imbalance in the number of contained rendering objects) of the data in each band, the time necessary for the rendering processing in each area may vary. As the result, the parallelism in the processing may vary.

Further, due to the rendering processing time in a band having high complexity, overall processing time may be affected. Further, since the objects are divided into the band units, the relationship among the individual objects may be lost. As the result, the data may not be restored.

In the technique discussed in Japanese Patent Application Laid-Open No. 2006-331191, when overlapping of the objects is determined and the assignment of the processing is performed, the determination and the assignment may be affected by a large-sized object. As a result, the processing may not be evenly assigned.

For example, like a presentation document using a template, when objects such as characters are disposed on a background of an object such as an image or a graphic that extends all over a drawing area, the above-described problems may occur. Further, for the determination of the overlap, it is necessary to spool data of at least one page. Accordingly, start of the processing may be delayed.

SUMMARY OF THE INVENTION

The present invention is directed to an image forming apparatus and an image forming system that can reduce time required for printing.

According to an aspect of the present invention, an image forming apparatus includes a plurality of conversion units configured to convert first data to second data, a selection unit configured to select one or more conversion units from among the plurality of conversion units based on information attached to the first data, and a print unit configured to perform printing using the second data, wherein the selection unit assigns one conversion unit to convert the first data when specific information is included in the information in the first data.

According to another aspect of the present invention, an image forming system includes an object division unit configured to divide an object specified by a drawing instruction from an application into a plurality of divided objects along predetermined areas, a generation unit configured to generate first data described in a printing device control language about the object divided by the object division unit, an attaching unit configured to attach group information that indicates relationship among the plurality of divided objects to the first data, a plurality of conversion units configured to convert the first data into second data, a selection unit configured to select one or more conversion units for converting the first data from among the plurality of conversion units based on the group information attached to the first data, and a print unit configured to perform printing using the second data, wherein the selection unit assigns one conversion unit to convert the first data when specific information is included in the group information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous exemplary embodiments, features and aspects of the invention and, together with the description, serve to explain the principles of the invention.

DETAILED DESCRIPTION OF THE EMBODIMENTS

Various exemplary embodiments, features and aspects of the present invention will be described in detail below with reference to the drawings.

Figure 1:
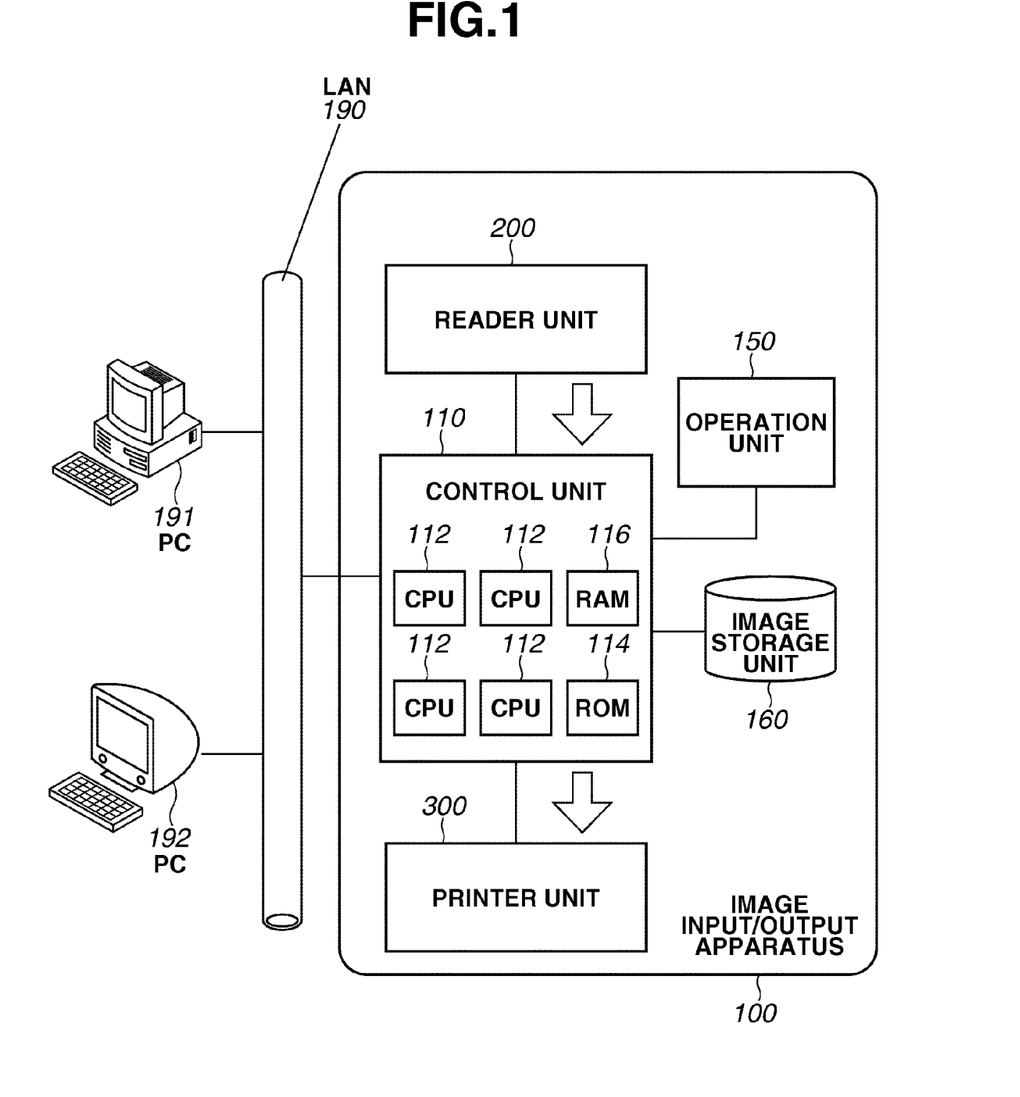
FIG. 1 is a block diagram illustrating a configuration of a printing system.

A printing system (image forming system) that is common in exemplary embodiments of the present invention is briefly described. FIG. 1 is a block diagram illustrating a configuration of the printing system.

In the printing system, an image input/output apparatus (image forming apparatus) 100 is connected to a PC (host computer) 191 and a PC 192 via a network such as a local area network (LAN) 190.

The image input/output apparatus 100 is, for example, a multi function peripheral (MFP). However, a single function peripheral (SFP), a laser beam printer (LBP), or a printer of other printing systems may be used.

The image input/output apparatus 100 includes a reader unit 200, a printer unit 300, an operation unit 150, an image storage unit 160, and a control unit 110 that controls the above-mentioned units. The control unit 110 includes a plurality of CPUs 112, a read-only memory (ROM) 114, and a random access memory (RAM) 116. The CPUs 112 control the entire image input/output apparatus 100 in accordance with a program stored in the ROM 114 or another storage medium.

The number of the CPUs 112 is not particularly limited. For example, the number of the CPUs 112 is two or four. In place of the plurality of CPUs 112, a multi-core CPU may be used. That is, a CPU having a plurality of processor cores may be used. The RAM 116 is used, for example, as work area for the CPUs 112.

The reader unit 200 reads image data. The printer unit 300 outputs image data using a printer engine. The operation unit 150 includes a keyboard for users to perform input/output operation of image data and a liquid crystal panel for displaying or setting the image data and various functions. The image storage unit 160 can store image data and data described in a printing device control language (for example, an escape (ESC) code or a page description language (PDL)).

The PCs 191 and 192 generate data (for example, PDL data) described in the printing device control language using a printer driver based on a print instruction sent from an application in the PC via an OS. The PCs 191 and 192 send the generated data to the image input/output apparatus 100 via the LAN 190.

The image input/output apparatus 100 receives the data described in the printing device control language. Based on the data, the plurality of CPUs 112 perform processing for generating image data. The image input/output apparatus 100 outputs the generated image data to a print medium such as paper using the printer unit 300. In the above-described processing, the plurality of CPUs 112 perform the processing in parallel. Detailed description of the parallel processing will be made below.

Figure 2:
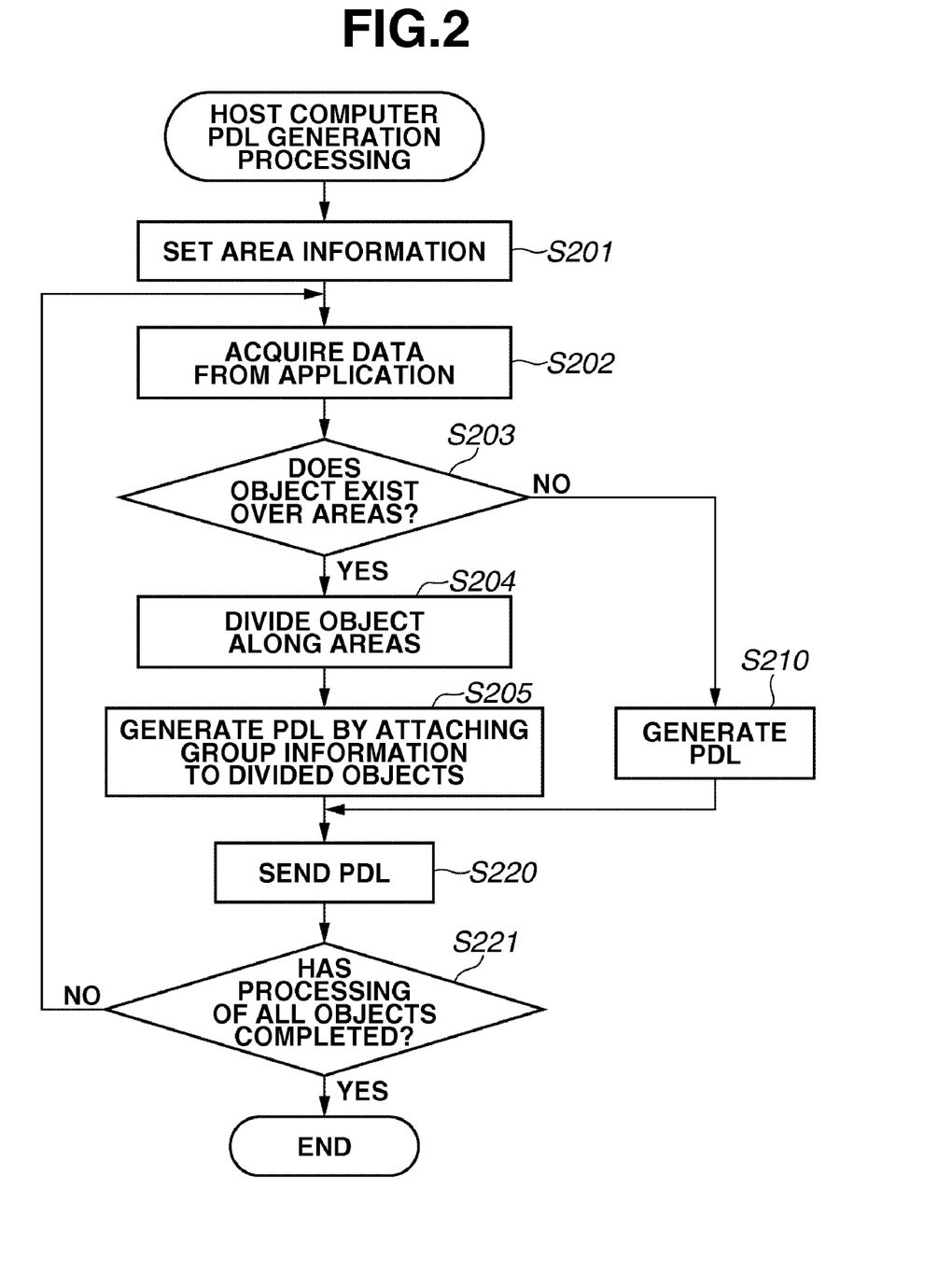
FIG. 2 is a flowchart illustrating contents of processing performed in a personal computer (PC) according to a first exemplary embodiment of the present invention.
Figure 3:
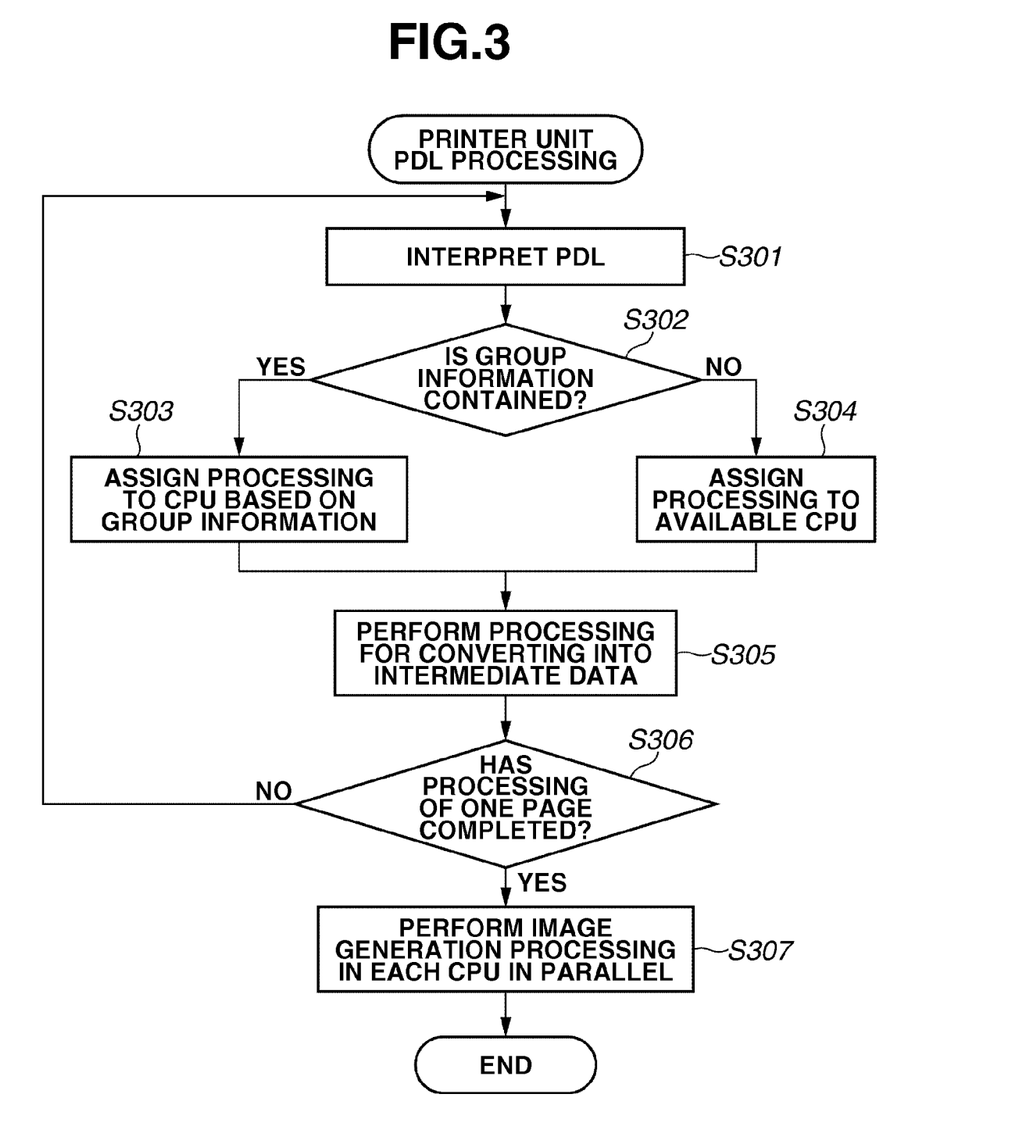
FIG. 3 is a flowchart illustrating contents of processing performed in a control unit according to the first exemplary embodiment of the present invention.

Now, a first exemplary embodiment of the present invention is described. FIG. 2 is a flowchart illustrating contents of processing (generation (formation) and transmission of PDL data) performed in the PC 191 according to the first exemplary embodiment. FIG. 3 is a flowchart illustrating contents of processing (processing of PDL data) performed in the control unit 110 according to the first exemplary embodiment.

Figure 4A:
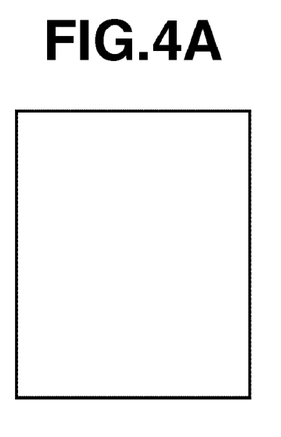
FIGS. 4A, 4B, and 4C illustrate examples of division of an area.
Figure 4B:
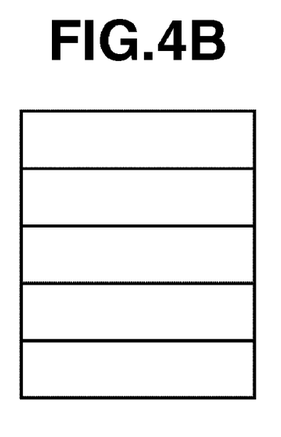

First, as illustrated in FIG. 2, in step S201, the PC 191 sets area information (information about location, size, etc.) for each processing unit (band, packet, etc.) in each CPU 112 in the control unit 110. For example, a page area stored as illustrated in FIG. 4A is divided into areas of band units or packets as illustrated in FIG. 4B or 4C.

Figure 4C:
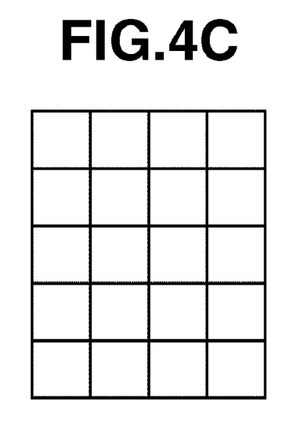

Hereinafter, as illustrated in FIG. 4C, it is assumed that a page area is divided into packet units. The above-mentioned processing units may be acquired by inquiring of the image input/output apparatus 100, or a predetermined value provided in advance may be used.

In step S202, the PC 191 acquires data of an object from an application via an OS. When a plurality of objects exist, data of one of the objects is acquired.

In step S203, the PC 191 determines whether the data of the object acquired in step S202 exists over the plurality of areas set in step S201.

Figure 5:
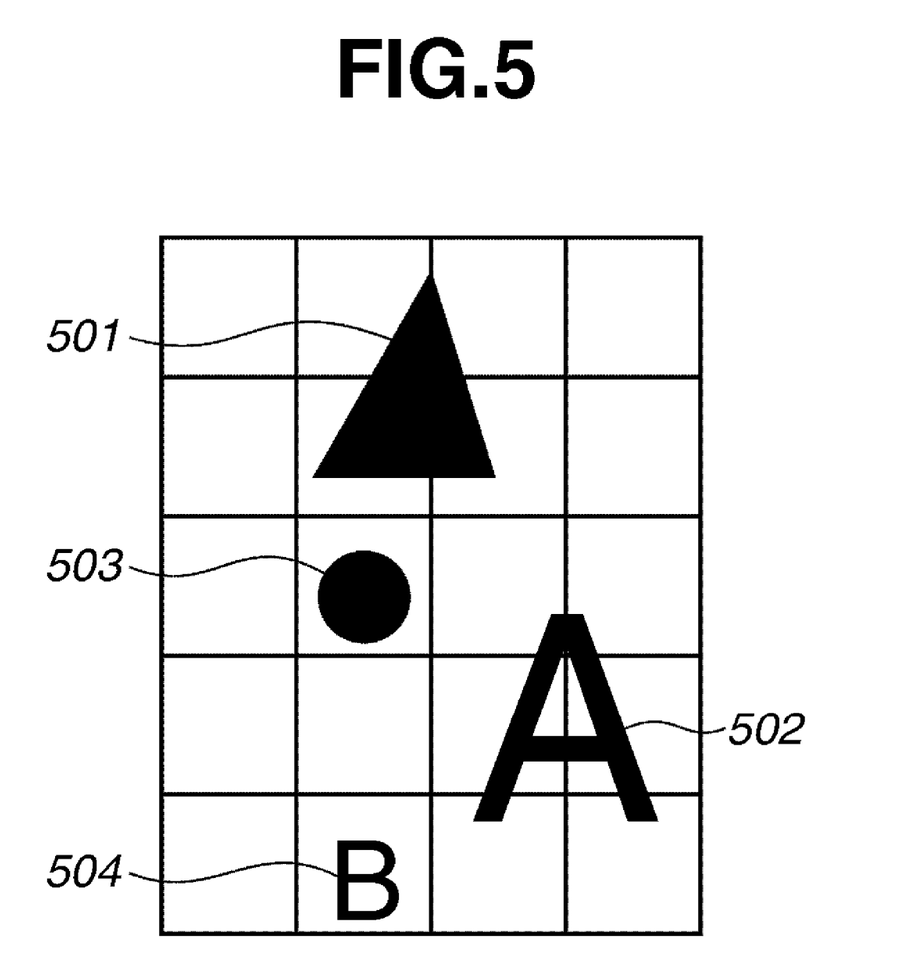
FIG. 5 illustrates an example of objects.

For example, it is determined that each of a triangular graphic object 501 and a text object 502 of a character "A" exists over a plurality of areas, and each of a circular graphic object 503 and a text object 504 of a character "B" does not exist over a plurality of areas. When the object extends over the plurality of areas (YES in step S203), processing in step S204 is performed. When the object does not extend over the plurality of areas (NO in step S203), processing in step S210 is performed.

Figure 6A:
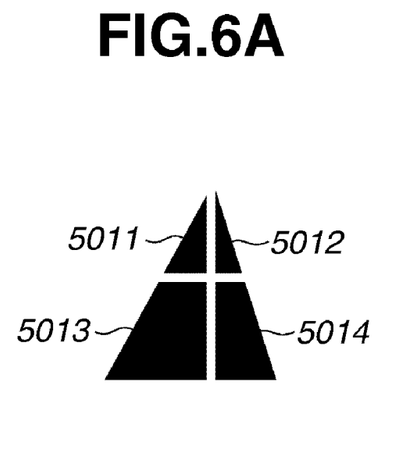
FIGS. 6A and 6B illustrate examples of division of an object.

In step S204, the PC 191 serves as an object division unit, and divides the object that extends over the plurality of areas set in step S201 along borders of the areas where the object exist. For example, as illustrated in FIG. 6A, the graphic object 501 is divided into divided objects 5011 to 5014 along the borders of the areas.

Figure 6B:
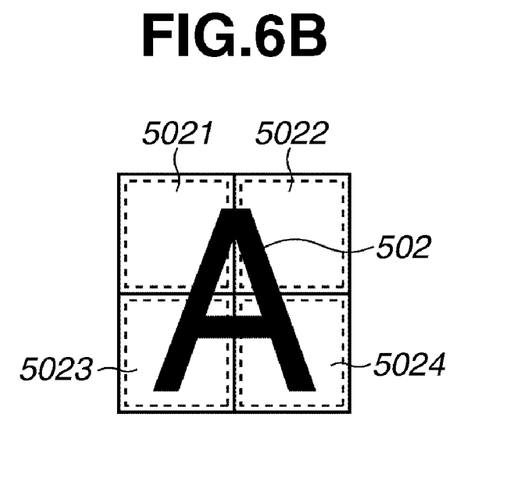

As illustrated in FIG. 6B, the text object 502 is divided into divided objects 5021 to 5024 by setting clip information along the borders of the areas. In the exemplary embodiment, as the clip areas, the areas set in step S201 are used. However, the clip areas may be provided by combining information such as a bounding box of a character with the area information set in step S201. As long as the division of the object can be specified along the borders of the areas, any method may be used.

In step S205, the PC 191 generates PDL data by attaching group information indicating relationship among the divided objects to information (divided object information) of an object group of the divided objects divided in step S204.

When the group information is attached, for example, information indicating that the divided objects belong to the same group may be attached to drawing commands of the individual divided objects, or the front and back of the object group of the divided objects may be surrounded by commands indicating start and end of the group. As long as it is possible to indicate that the divided objects belong to the same object group, the group information may be attached by any method.

In step S210, the PC 191 generates PDL data of the object acquired in step S202.

After step S205 or step S210, in step S220, the PC 191 sends the PDL data generated in step S205 or step S210 to the image input/output apparatus 100.

In step S221, the PC 191 determines whether the processing of all of the objects acquired from the application has been completed. When the processing has not been completed (NO in step S221), the processing returns to step S202. When the processing has been completed (YES in step S221), the PDL data generation processing ends.

As described above, the PC 191 repeatedly performs the PDL data generation processing on the all objects acquired from the application.

In the image input/output apparatus 100 that received the PDL data, first, in step S301, one (hereinafter, referred to as a main CPU 112) of the CPUs 112 performs interpretation processing of the received PDL data. By performing processing such as setting based on a command for setting, the command of the object group containing the object and the group information attached in step S205 is interpreted.

In step S302, the main CPU 112 determines whether the command interpreted in step S301 contains the group information attached in step S205. When the group information is contained (YES in step S302), processing in step S303 is performed. When the group information is not contained (NO in step S302), processing in step S304 is performed.

In step S303, the main CPU 112 that serves as a selection unit searches the CPU 112 that is available for processing. Based on the above result, the group information, and the information of the divided objects, the main CPU 112 determines a CPU 112 to assign the processing of the individual divided objects. That is, one or more CPUs 112 are selected to perform the processing.

In the determination, the main CPU 112 may include the main CPU 112 itself as the CPU to which the processing is assigned. For example, as the objects 5021 to 5024 illustrated in FIG. 6B, with respect to the object group that is specified to be divided by the clip processing, the processing is assigned to a single CPU 112. More specifically, with respect to the object group to which the specific information is attached, the processing is assigned to the single CPU 112.

On the other hand, like the divided objects 5011 to 5014 illustrated in FIG. 6A, when the objects are explicitly divided, the processing is in turn assigned to available CPUs 112. In step S205, when attaching the group information, the PC 191 attaches information indicating whether the processing is to be assigned to a single CPU to the group information. Based on the information, the assignment of the CPU 112 may be performed.

For example, the specific information may include information that the object is divided by the clip processing, or information that the object is a character. Further, the specific information may include information that the object is drawn using a gradation pattern or a tile pattern.

Effects of the above-described assignment of the processing will be described with reference to FIGS. 7A and 7B.

Figure 7A:
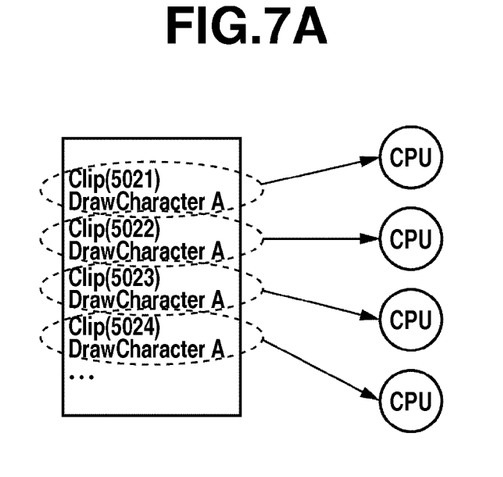
FIGS. 7A and 7B illustrate examples for assigning processing to a plurality of central processing units (CPUs)
Figure 7B:
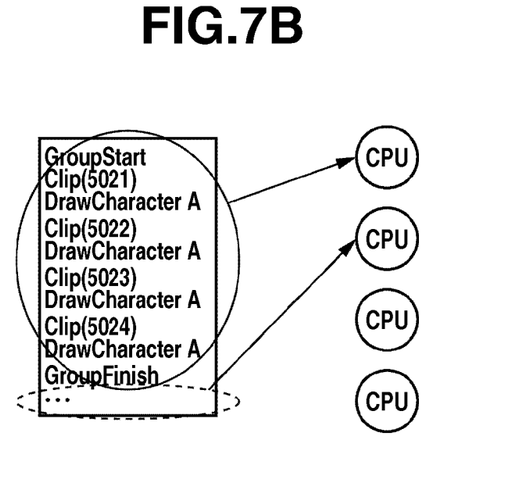

FIG. 7A illustrates processing performed when the processing is assigned to available CPUs in turn. FIG. 7B illustrates processing performed when the group is assigned to a single CPU. As illustrated in FIG. 7B, by assigning the group to a single CPU, the processing can be performed while data (in this example, DrawCharacter A) is stored in cache memory of the CPU. Accordingly, the CPU cash can be effectively used. Thus, the processing can be performed even faster.

In step S304, the main CPU 112 searches a CPU 112 that is available for the processing and assigns the processing for the object.

After step S303 or S304, in step S305, the CPU 112 (conversion unit) to which the processing is assigned in step S303 or S304 converts the data (first data) received from the PC 191 into intermediate data (second data) suitable for processing in the image input/output apparatus 100. The converted intermediate data is sequentially stored in the RAM 116 on the region basis of the processing unit of the CPU 112.

The processing unit corresponds to the processing unit of the area information set in step S201. The CPUs 112 to which the processing is assigned independently perform the processing in parallel. Accordingly, the CPUs 112 perform the processing in step S306 without waiting for completion of the processing of the other CPUs 112.

In step S306, the main CPU 112 determines whether the all of the interpretation of the objects in the page has been completed. When the interpretation has not been completed (NO in step S306), the processing returns to step S301. When the interpretation has been completed (YES in step S306), the main CPU 112 waits for completion of the generation of the intermediate data of one page, and performs processing in step S307.

In step S307, the main CPU 112 instructs the plurality of CPUs 112 to perform image generation processing in parallel based on the intermediate data generated in step S306 on the processing unit basis. When an image of one page is generated, the processing ends. Then, the printer unit 300 performs printing of the generated image of one page.

As described above, in the first exemplary embodiment, the PC 191 performs the object division processing and the PDL data generation processing. The control unit 110 (a plurality of the CPUs 112) in the image input/output apparatus 100 performs the processing to interpret the PDL data and the image generation processing. The PC 192 may perform processing similar to the PC 191.

Figure 8A:
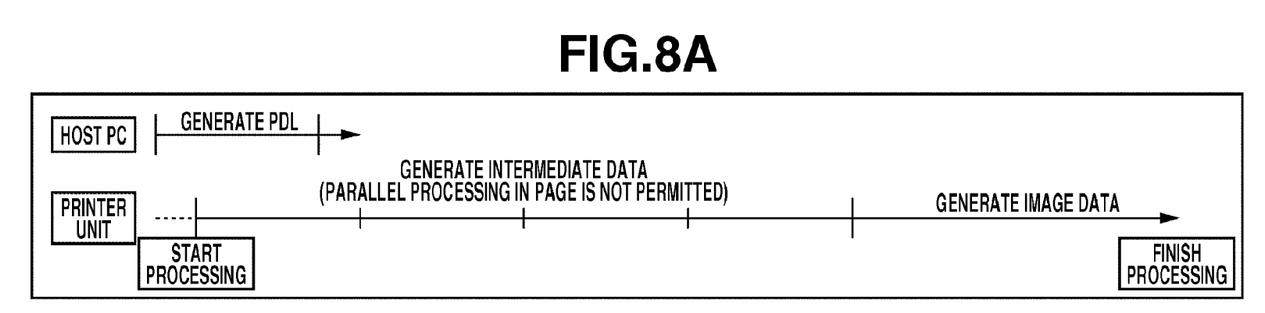
FIGS. 8A, 8B, and 8C are time charts illustrating effects according to the first exemplary embodiment of the present invention.
Figure 8B:
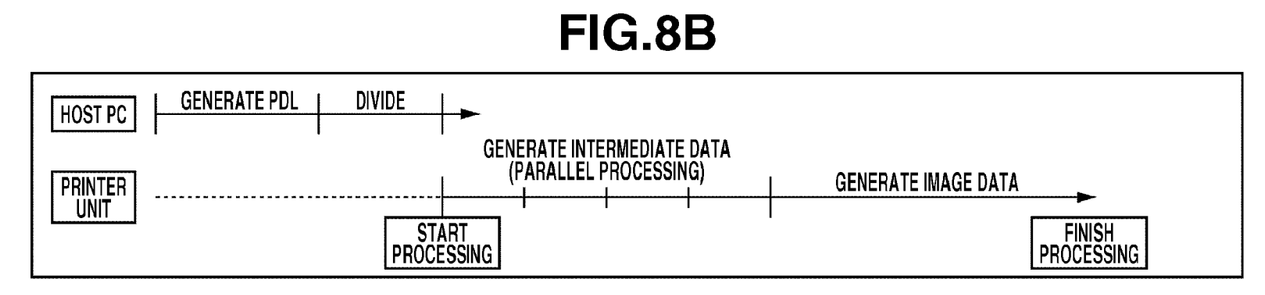
Figure 8C:
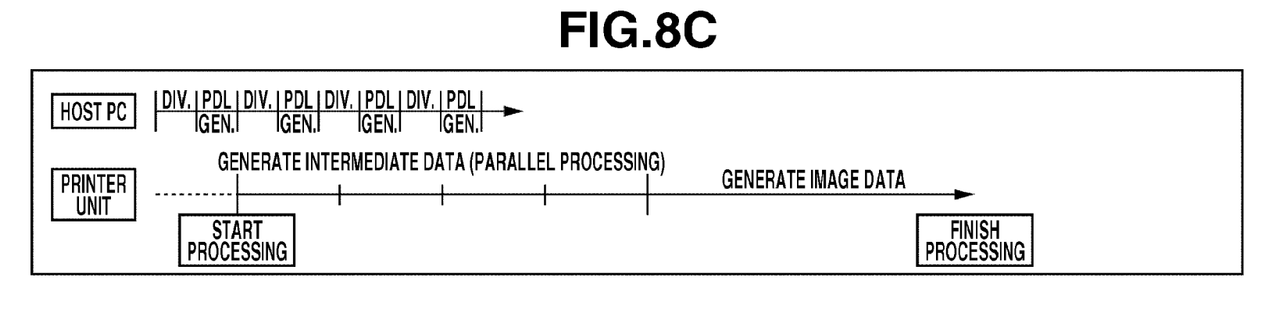

Effects in the first exemplary embodiment will be described with reference to time charts in FIGS. 8A, 8B, and 8C. FIG. 8A is a time chart illustrating normal processing without parallel processing. FIG. 8B is a time chart illustrating processing (known technique) that a host computer spools data of one page and performs parallel processing. FIG. 8C is a time chart illustrating the processing according to the first exemplary embodiment.

In the processing illustrated in FIG. 8A, parallel processing is not performed. Accordingly, it takes a lot of time to perform processing to generate intermediate data. In the processing illustrated in FIG. 8B, after the data of one page is spooled, when division processing is performed, processing to rearrange the data or eliminate overlapping can be performed. Accordingly, the processing to generate intermediate data is faster.

However, since the data of one page has to be spooled, it is necessary to wait for generation and division of PDL data in the host PC (host computer). Accordingly, processing start in the printing unit is delayed.

On the other hand, in the processing illustrated in FIG. 8C, the overall printing time is shortest. More specifically, as compared with the example illustrated in FIG. 8A, the processing start is slightly delayed, however, it is not so late as compared to the example illustrated in FIG. 8B. The speed to process the intermediate data generation is slower than the example illustrated in FIG. 8B, however, it is faster than the example illustrated in FIG. 8A.

In the example illustrated in FIG. 8C, the division, the generation of the PDL data, and the data transmission (steps S204, S205, and S220) are repeated by the object unit. Accordingly, the processing load of the host PC (host computer) is larger than the other examples. However, the printing time is not substantially affected.

The assignment of the processing in step S303 may be performed with reference to Apply information that indicates to which CPU 112 processing of which area is lastly assigned. The Apply information may be held, for example, by the RAM 116 that serves as an information storage unit.

Figure 9A:
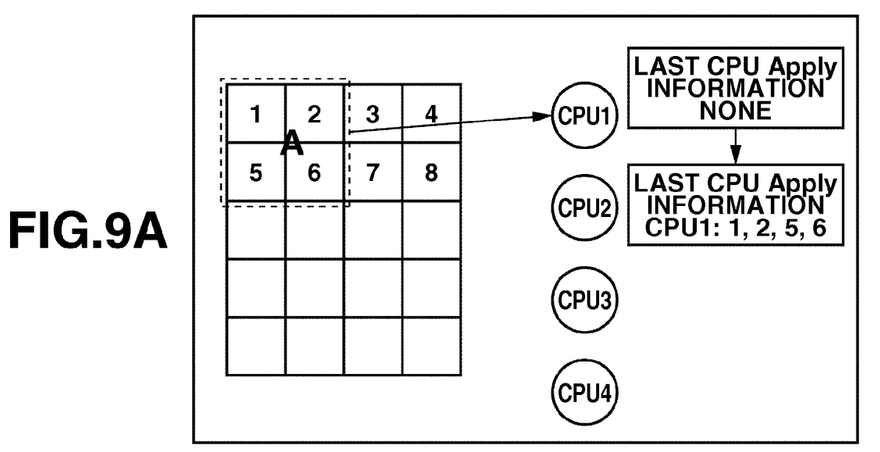
FIGS. 9A, 9B, and 9C illustrate methods for assigning processing to CPUs with reference to Apply information.
Figure 9B:
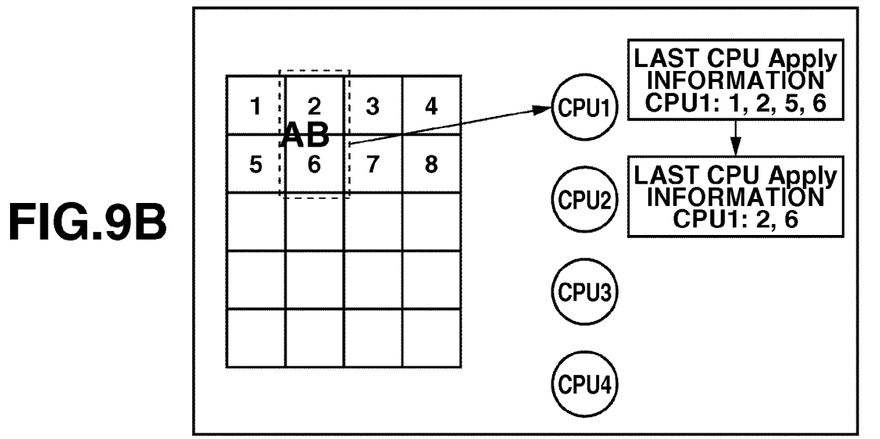
Figure 9C:
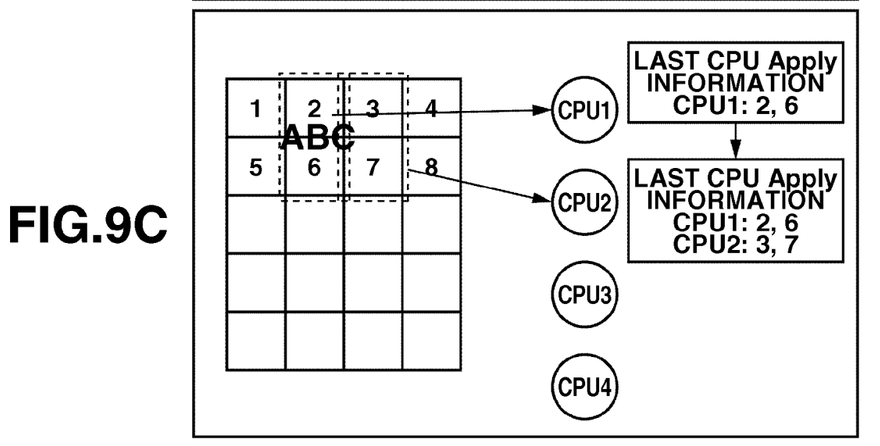

FIGS. 9A, 9B, and 9C illustrate methods to assign CPUs with reference to the Apply information. In FIGS. 9A, 9B, and 9C, a CPU 1, a CPU 2, a CPU 3, and a CPU 4 are one of the CPUs 112 respectively. It is assumed that a character "A" is drawn in areas "1", "2", "5", and "6", a character "B" is drawn in areas "2" and "6", and a character "C" is drawn in areas "2", "3", "6", and "7". The drawing is performed in the order of the character "A", "B", to "C".

First, as illustrated in FIG. 9A, when the character "A" is drawn, the drawing processing is a first drawing. Accordingly, there is no last Apply information. Accordingly, all processing of the object group surrounded by the group is assigned to the CPU 1, and information of "CPU 1: 1, 2, 5, 6" is input to the last Apply information.

Then, as illustrated in FIG. 9B, when the character "B" is drawn, in the last Apply information, information of the areas "2" and "6" where the character "B" is drawn is included. Accordingly, the processing is directly assigned to the CPU 1, and information of "CPU 1: 2, 6" is input in the last Apply information.

Then, as illustrated in FIG. 9C, when the character "C" is drawn, in the last Apply information, information of the areas "2" and "6" where the character "C" is drawn is included. However, information of the areas "3" and "7" is not included. Accordingly, the processing in the areas "2" and "6" is directly assigned to the CPU 1. Further, the processing in the areas "2" and "6" does not correspond to the case where the information is included in the last Apply information. Accordingly, the processing is assigned to the next CPU 2.

Then, information of "CPU 1: 2, 6, CPU 2: 3, 7" is input in the last Apply information. By the above-described processing, while the parallel processing is being performed even if the drawing areas of the group are overlapped, it is not necessary to wait for access to the same drawing area. Accordingly, the processing can be processed at a high speed.

A second exemplary embodiment of the present invention is described. In the second exemplary embodiment, a plurality of CPUs are provided in the PC 191. Different from the first exemplary embodiment, generation of intermediate data is performed without PDL data being generated by the PC 191. Using the intermediate data, the control unit 110 in the image input/output apparatus 100 performs image generation processing. The other configurations are similar to those in the first exemplary embodiment.

Figure 10:
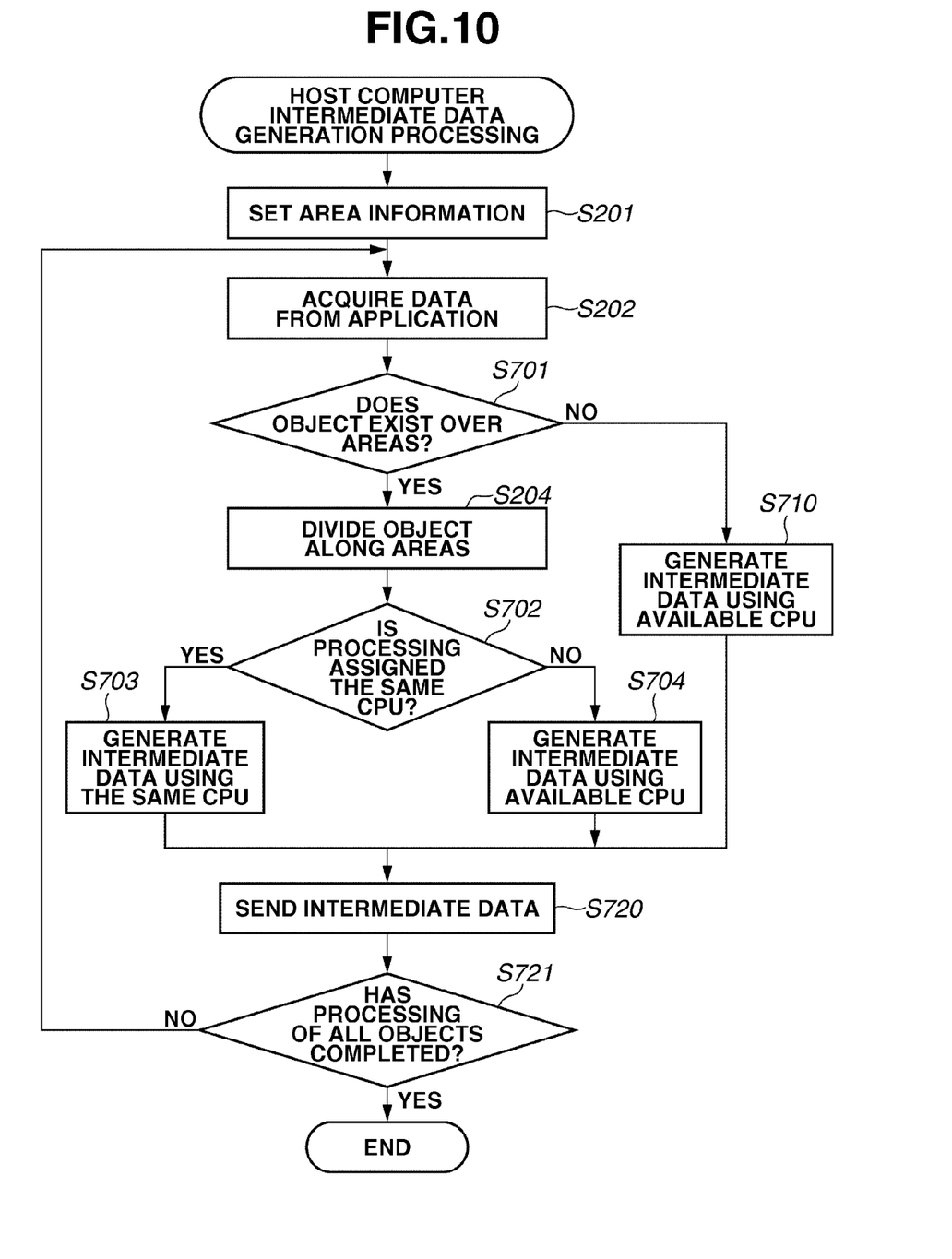
FIG. 10 is a flowchart illustrating contents of processing performed in a PC according to a second exemplary embodiment of the present invention.
Figure 11:
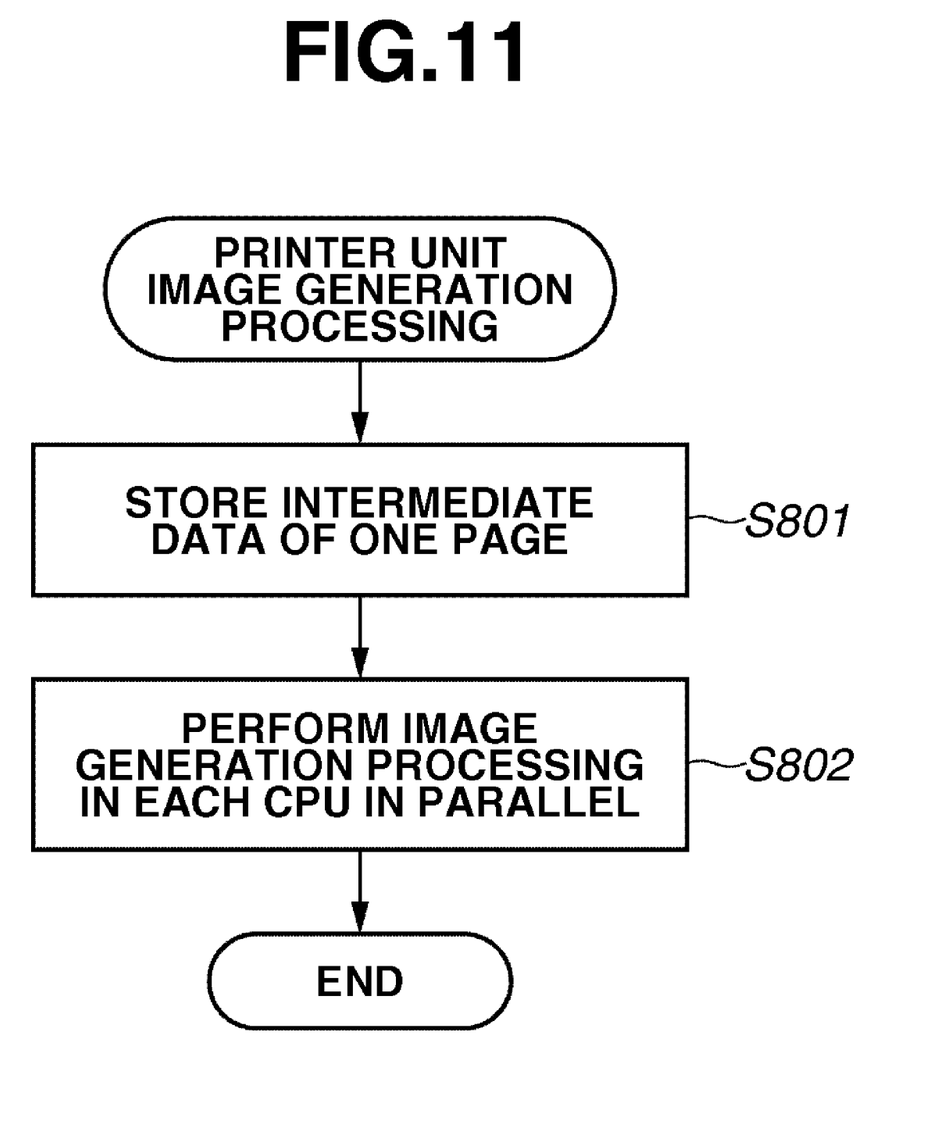
FIG. 11 is a flowchart illustrating contents of processing performed in a control unit according to the second exemplary embodiment of the present invention.

FIG. 10 is a flowchart illustrating contents of processing (generation and transmission of intermediate data) performed in the PC 191 according to the second exemplary embodiment. FIG. 11 is a flowchart illustrating contents of processing (image generation processing) performed in the control unit 110 according to the second exemplary embodiment.

In the second exemplary embodiment, similarly to the first exemplary embodiment, one (the main CPU 112) of the CPUs in the PC 191 sets area information for processing units in each CPU 112 in the control unit 110. In step S202, the PC 191 acquires data of an object from the application via the OS.

In step S701, the main CPU 112 in the PC 191 determines whether the data of the object acquired in step S202 exists over the plurality of areas set in step S201. When the object extends over the plurality of areas (YES in step S701), processing in step S204 is performed. When the object does not extend over the plurality of areas (NO in step S701), processing in step S710 is performed.

In step S204, the main CPU 112 in the PC 191 divides the object that extends over the plurality of areas set in step S201 along borders of the areas where the object exists.

In step S702, the main CPU 112 determines whether to assign the processing of the divided objects to a single CPU. The reference of the determination is similar to that in step S303 in the first exemplary embodiment. When the processing is performed by the single CPU (YES in step S702), processing in step S703 is performed. When the processing is not performed by a single CPU (NO in step S702), processing in step S704 is performed.

In step S703, the single CPU to which the processing is assigned converts the object group of the divided objects into intermediate data.

Meanwhile, in step S704, the main CPU 112 assigns the processing to CPUs in turn that are available for the processing. Then, the CPUs to which the processing is assigned convert the object group of the divided objects into intermediate data.

In step S710, the main CPU 112 assigns the processing to CPUs that are available for the processing. Then, the CPUs convert the object into intermediate data.

After step S703, S704, or S710, in step S720, the main CPU 112 sends the generated intermediate data to the image input/output apparatus 100.

In step S721, the main CPU 112 determines whether the processing of all of the objects acquired from the application has been completed. When the processing has not been completed (NO in step S721), the processing returns to step S202. When the processing has been completed (YES in step S721), the generation and transmission of the intermediate data ends.

As described above, the PC 191 repeatedly performs the generation and transmission of the intermediate data on the all objects acquired from the application.

In the image input/output apparatus 100 that has received the intermediate data, first, in step S801, the main CPU 112 stores the intermediate data of one page.

In step S802, the main CPU 112 searches CPUs 112 that are available for the processing. The CPUs 112 perform image generation processing in parallel based on the intermediate data stored in step S801 on the processing unit basis. When an image of one page is generated, the processing ends. The processing unit corresponds to the processing unit of the area information set in step S201. Then, the printer unit 300 performs printing of the generated image of one page.

According to the second exemplary embodiment, the generation of the intermediate data is also performed in the PC 191. Accordingly, when the PC 191 is a terminal that can perform high-speed processing, the printing time can be further reduced.

In the second exemplary embodiment, in step S720, the generated intermediate data is continually transmitted to the image input/output apparatus 100. However, the intermediate data may be sent after storage of the data of one page has been completed. Further, as long as a data format that can store the group information in the intermediate data, in steps S703 and S704, the group information may be attached.

Further, in the second exemplary embodiment, the intermediate data is directly generated according to the drawing instruction from the application. However, after PDL data is generated, the generation of the intermediate data may be performed. Further, the PC 192 may have a plurality of CPUs and perform processing similar to the PC 191.

A third exemplary embodiment of the present invention is described. The third exemplary embodiment differs from the first exemplary embodiment in operation of the image input/output apparatus 100 when PDL data containing divided objects and group information is received. The other configurations are similar to those in the first exemplary embodiment.

Figure 12:
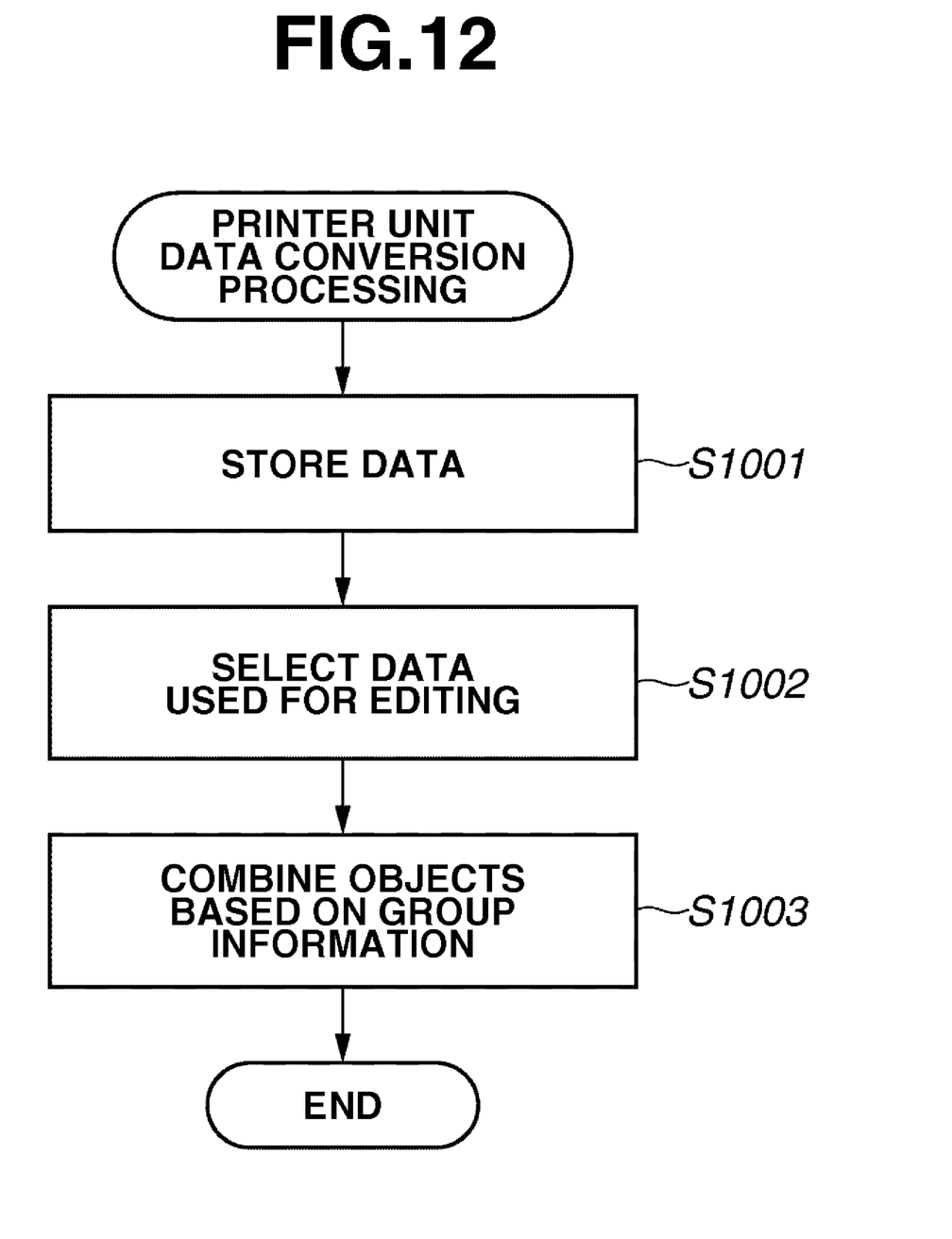
FIG. 12 is a flowchart illustrating contents of processing performed in a control unit according to a third exemplary embodiment of the present invention.

FIG. 12 is a flowchart illustrating contents of processing (data conversion processing) performed in the control unit 110 according to the third exemplary embodiment.

In the third exemplary embodiment, in the image input/output apparatus 100 that has received PDL data, first, in step S1001, the main CPU 112 stores the received PDL data in the storage unit 160.

In step S1002, the main CPU 112 prompts a user to select data to be used for editing from the PDL data stored in step S1001, and receives the selection made by using the operation unit 150.

In step S1003, based on the group information in the selected PDL data, the main CPU 112 combines the divided objects in the object group to form an original object.

According to the above-described third exemplary embodiment, by combining the data to form the one object, reediting using an application in such as the image input/output apparatus 100 or the PC 191 can be performed more easily. The reedited PDL data is stored in the image storage unit 160 again, and print processing can be performed.

In other words, on the PDL data once stored in the image storage unit 160, editing operation such as relocation of an object can be performed. After the edited PDL data is stored again, by selecting the PDL data using the operation unit 150, print processing can be started.

In the third exemplary embodiment, the image input/output apparatus 100 processes the PDL data. However, even if intermediate data is received as in the second exemplary embodiment, as long as the group information is attached, a similar operation can be performed.

The exemplary embodiments of the present invention can be achieved, for example, by executing a program by a computer. Further, an aspect of the present invention can be achieved by means for supplying the program to the computer, for example, a computer-readable recording medium such as a compact disc read only memory (CD-ROM) which records the program, or transmission medium such as the Internet which transmits the program. Further, an aspect of the present invention can be achieved by the above-described program for print processing. In such a case, the above-described program, recording medium, transmission medium, and the program product constitute the present invention.

According to the exemplary embodiments of the present invention, when conversion is performed using a plurality of conversion units, based on information attached to the first data, one or more conversion units are appropriately selected. Accordingly, the printing can be started at an early stage, and time necessary for the printing can be further reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-138582 filed May 27, 2008, which is hereby incorporated by reference herein in its entirety.

What is claimed is:

1. An image forming apparatus comprising:
a plurality of conversion units configured to convert first data of a plurality of divided objects to second data, the first data of the plurality of divided objects being obtained by dividing a single object into a plurality of portions of the single object;
a selection unit configured to select one or more conversion units from among the plurality of conversion units based on information attached to the first data; and
a print unit configured to perform printing using the second data,
wherein the selection unit assigns a single conversion unit among the plurality of conversion units to convert the first data in a case where specific information is included in the information in the first data.

2. The image forming apparatus according to claim 1, wherein the first data is described in a printing device control language.

3. The image forming apparatus according to claim 1, wherein the first data includes divided object information for specifying a plurality of divided objects that form one object, and group information that indicates relationship among the plurality of divided objects, and the selection unit performs the selection of one or more conversion units based on the group information.

4. The image forming apparatus according to claim 3, wherein the specific information indicates that the plurality of divided objects are generated by clipping processing of the object.

5. The image forming apparatus according to claim 3, wherein the specific information indicates that the object is a character.

6. The image forming apparatus according to claim 3, wherein the specific information indicates that the object is drawn by using a gradation pattern or a tile pattern.

7. The image forming apparatus according to claim 3, further comprising a combination unit configured to combine the plurality of divided objects and generate an object based on the group information.

8. The image forming apparatus according to claim 1, further comprising an information storage unit configured to store information indicating relationship between an area processed in the conversion and the conversion unit that performed the conversion in a case where the conversion is performed,
wherein the selection unit refers to the information stored on the information storage unit in selecting the conversion unit, and in a case where an area to be converted was also to be converted in the last conversion, selects the conversion unit that performed the last conversion, and in the other cases, selects a conversion unit from remaining conversion units.

9. An information processing apparatus comprising:
an object division unit configured to divide single object specified by a drawing instruction from an application into a plurality of divided objects along predetermined areas, the single object extending over a plurality of the predetermined areas;
a generation unit configured to generate data in a printing device control language about the object divided by the object division unit; and
an attaching unit configured to attach group information that indicates relationship among the plurality of divided objects to the data.

10. The information processing apparatus according to claim 9, wherein the predetermined areas are determined based on a configuration of an image forming apparatus that performs printing based on the data.

11. The information processing apparatus according to claim 9, wherein in a case where the object division unit performed the division by clipping processing of the object, the attaching unit inputs information indicating the division into the group information.

12. The information processing apparatus according to claim 9, wherein in a case where the object is a character, the attaching unit inputs information indicating that the object is the character.

13. The information processing apparatus according to claim 9, wherein in a case where the object is drawn by using a gradation pattern or a tile pattern, the attaching unit inputs information indicating that the object is drawn by using the gradation pattern or the tile pattern.

14. An image forming system comprising:
an object division unit configured to divide an object specified by a drawing instruction from an application into a plurality of divided objects along predetermined areas;
a generation unit configured to generate first data described in a printing device control language about the object divided by the object division unit;
an attaching unit configured to attach group information that indicates relationship among the plurality of divided objects to the first data;
a plurality of conversion units configured to convert the first data into second data;
a selection unit configured to select one or more conversion units for converting the first data from among the plurality of conversion units based on the group information attached to the first data; and
a print unit configured to perform printing using the second data,
wherein the selection unit assigns one conversion unit to convert the first data in a case where specific information is included in the group information.

15. An image forming method using an image forming apparatus including a plurality of conversion units configured to convert first data of a plurality of divided objects into second data, the first data of the plurality of divided objects being obtained by dividing a single object into a plurality of portions of the single object, the image forming method comprising:
selecting one or more conversion units for performing conversion of the first data from among the plurality of conversion units based on information attached to the first data;
performing printing using the second data; and
assigning a single conversion unit among the plurality of conversion units to convert the first data in a case where specific information is included in the information included in the first data.

16. An information processing method comprising:
dividing single object specified by a drawing instruction from an application into a plurality of divided objects along predetermined areas, the single object extending over a plurality of the predetermined areas;
generating data described in a printing device control language about the divided object; and
attaching group information that indicates relationship among the plurality of divided objects to the data.

17. A non-transitory computer-readable storage medium storing instructions of a program for instructing a computer to control an image forming apparatus having a plurality of conversion units configured to convert first data of a plurality of divided objects into second data, the first data of the plurality of divided objects being obtained by dividing a single object into a plurality of portions of the single object, the instructions comprising:
instructing the computer to select one or more conversion units for performing the conversion of the first data from among the plurality of conversion units based on information attached to the first data;
instructing the computer to perform printing using the second data; and
instructing the computer to assign a single conversion unit among the plurality of conversion units to convert the first data in a case where specific information is included in the information included in the first data.

18. A non-transitory computer-readable storage medium storing instructions of a program for instructing a computer to perform image processing, the instructions comprising:
dividing single object specified by a drawing instruction from an application into a plurality of divided objects along predetermined areas, the single object extending over a plurality of the predetermined areas;
generating data described in a printing device control language about the divided objects; and
attaching group information that indicates relationship among the plurality of divided objects to the data.

* * * * *